US011567385B2

(12) United States Patent
Kinlen et al.

(10) Patent No.: US 11,567,385 B2
(45) Date of Patent: Jan. 31, 2023

(54) ELECTROCHROMIC DEVICE

(71) Applicant: THE BOEING COMPANY, Chicago, IL (US)

(72) Inventors: Patrick J. Kinlen, Fenton, MO (US); Matthew A. Flack, St. Louis, MO (US); Loyal Bruce Shawgo, St. Louis, MO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 17/671,772

(22) Filed: Feb. 15, 2022

(65) Prior Publication Data
US 2022/0171247 A1  Jun. 2, 2022

Related U.S. Application Data

(62) Division of application No. 15/850,726, filed on Dec. 21, 2017, now Pat. No. 11,307,476.

(51) Int. Cl.
G02F 1/157 (2006.01)
G02F 1/153 (2006.01)
(Continued)

(52) U.S. Cl.
CPC .............. G02F 1/157 (2013.01); C08F 14/22 (2013.01); C08F 14/28 (2013.01); C08K 3/32 (2013.01); C08K 5/3445 (2013.01); C08K 5/435 (2013.01); C08K 5/55 (2013.01); C09K 9/02 (2013.01); G02F 1/133502 (2013.01); G02F 1/133509 (2013.01); G02F 1/1533 (2013.01);
(Continued)

(58) Field of Classification Search
CPC ........ G02F 1/157; G02F 1/153; G02F 1/1533; G02F 1/133502; G02F 1/133509; G02F 2001/1517; G02F 2001/1519; G02F 2001/164; G02F 2202/026; G02F 2201/08; G02F 2201/083; G02F 2201/086; A42B 3/226; C08F 14/22; C08F 14/28; C08K 5/55; C08K 5/3445; C08K 5/435; C08K 3/32; C08K 2201/001; C08K 2003/321; C09K 9/02; C09K 2211/1491; C09D 127/16; B64G 6/00
See application file for complete search history.

(56) References Cited

U.S. PATENT DOCUMENTS

| | | | |
|---|---|---|---|
| 7,808,692 | B2 | 10/2010 | Karmhag et al. |
| 7,874,666 | B2 | 1/2011 | Xu et al. |
| 2018/0017835 | A1 | 1/2018 | Kim et al. |

FOREIGN PATENT DOCUMENTS

DE    20 2013 009 819    4/2014

OTHER PUBLICATIONS

Bircan, H. et al. "Use of polymer/ionic liquid plasticizers as gel electrolytes in electrochromic devices" Journal of Physics (2008) vol. 127, pp. 1-7.

(Continued)

Primary Examiner — Jack Dinh
(74) Attorney, Agent, or Firm — McDonnell Boehnen Hulbert & Berghoff

(57) ABSTRACT

Disclosed are curved electrochromic devices comprising an electrochromic apparatus disposed between first and second curved layers of transparent material, and the first and second curved layers have exterior and inner surfaces, wherein the inner surfaces face the electrochromic apparatus. Also disclosed are processes for manufacturing the disclosed bubble visors.

20 Claims, 7 Drawing Sheets

(51) Int. Cl.
    *G02F 1/1335* (2006.01)
    *C08F 14/22* (2006.01)
    *C08F 14/28* (2006.01)
    *C08K 5/55* (2006.01)
    *C08K 5/3445* (2006.01)
    *C08K 5/435* (2006.01)
    *C08K 3/32* (2006.01)
    *C09K 9/02* (2006.01)
    *G02F 1/1516* (2019.01)
    *B64G 6/00* (2006.01)
    *A42B 3/22* (2006.01)
    *G02F 1/15* (2019.01)

(52) U.S. Cl.
    CPC ............... *A42B 3/226* (2013.01); *B64G 6/00* (2013.01); *C08K 2003/321* (2013.01); *C08K 2201/001* (2013.01); *C09K 2211/1491* (2013.01); *G02F 2001/1517* (2013.01); *G02F 2001/164* (2019.01); *G02F 2202/026* (2013.01)

(56) References Cited

OTHER PUBLICATIONS

Jansen, Johannes Carolus et al. "High Ionic Liquid Content Polymeric Gel Membranes: Preparation and Performance" Macromolecules (2011) vol. 44(1), pp. 39-45.

ELECTROCHROMIC DEVICE

FIELD

This disclosure relates to electrochromic devices, and more particularly to electrochromic devices in which the electrochromic materials are protected from decomposition. It also relates to electrochromic devices for use as extravehicular visor assemblies with space helmets.

BACKGROUND

Pressure suits for wear during extra-vehicular activities in space are subjected to harsh conditions, including the intense rays of the sun. The helmets attached to such suits typically incorporate a extravehicular or helmet visor through which an astronaut views his surroundings and work in which he is engaged, and through which passes visible light and other wavelengths of solar radiation.

Perception of color through helmet visors in space can be distorted due to various factors. Coatings or tinted helmet visors can be used to modify the radiation passing through the visor, but can be cumbersome to use in varying light conditions.

Electrochromic devices are based on electrochromism, a phenomenon that occurs due to electrochemical oxidation and reduction reactions that can take place in electrochromic materials, i.e., compounds that change color in response to application of a voltage. An electrochromic device (ECD) controls optical properties such as optical transmission, absorption, reflectance, and/or emittance in a continual but reversible manner on application of a voltage. Electrochromic devices include smart glass, electrochromic mirrors, and electrochromic display devices.

Electrochromic devices are electrochemical cells composed of two electrodes and an electrolytic medium. Such devices may have one or two electrochromic layers separated by an electrolyte layer. These devices works on an external voltage; conducting electrodes are used on both sides of the electrochromic layers.

Electrochromic devices normally fall into one of two classes depending upon the kind of electrolyte used. Laminated devices have a liquid gel while solid devices use a solid inorganic or organic electrolyte material. This disclosure is concerned with laminated devices.

Electrochromic compounds can be undesirably impacted by certain wavelengths of solar radiation.

There is a need for enhanced electrochromic devices, including visors In addition, there is also a need for devices and visors that overcome the limitations described above.

SUMMARY

The present disclosure provides electrochromic devices, particularly curved electrochromic devices, that avoid or reduce degradation of the electrochromic compounds used in such devices caused by intense solar radiation.

The present disclosure also permits user control of the light entering a space helmet. Thus, the user can address color distortion in space and consequently view the surroundings as they would be expected to appear on earth, e.g., in an atmosphere of oxygen.

Thus, in one aspect, this disclosure provides electrochromic devices comprising an electrochromic cell disposed between first and second curved layers of transparent material.

In certain aspects, the electrochromic devices are electrochromic visors, and in particular, electrochromic visors for use on a space helmet for extravehicular activity.

In another aspect, the electrochromic apparatus of the helmet visor comprises an electrolyte membrane comprising a non-aqueous electrolyte and a polymer. Typically, the non-aqueous electrolyte is an ionic liquid.

In another aspect, this disclosure provides electrochromic devices comprising a coating on the exterior of device that is capable of reflecting infrared and ultraviolet wavelength radiation.

In another aspect, this disclosure provides electrochromic devices comprising a coating on the exterior of the device that blocks wavelengths of visible radiation capable of initiating chemical decomposition of an electrochromic compound.

In still another aspect, the disclosure provides electrochromic devices that carry an exterior dielectric coating capable of transmitting light within the range of about 400 nm to 700 nm.

Yet another aspect of the disclosure provides space helmets that comprise a helmet visor comprising an electrochromic apparatus disposed between first and second curved layers of transparent material.

In yet another aspect, this disclosure provides helmets as described in the previous paragraph that further comprises a coupling mechanism for hermetically securing the helmet to a pressure suit.

In another aspect, this disclosure provides processes for manufacturing a helmet visor comprising an electrochromic apparatus disposed between first and second curved layers of transparent material. The processes includes several intermediate processes.

In another aspect, this disclosure provides an electrochromic device having a layer of transparent polymeric material connected to an electrochromic apparatus, wherein the transparent polymeric material comprises a coating opposite the electrochromic apparatus and that is capable of reflecting infrared and ultraviolet wavelength radiation;

a coating opposite the electrochromic apparatus and blocks wavelengths of visible radiation capable of initiating chemical decomposition of an electrochromic compound; or a dielectric coating capable of transmitting light within the range of about 400 nm to 700 nm.

In still another aspect, this disclosure provides a helmet comprising a visor comprising an electrochromic device, wherein the electrochromic device comprises an electrochromic apparatus disposed between first and second curved layers of transparent material, and the first and second curved layers have exterior and inner surfaces, wherein the inner surfaces face the electrochromic apparatus.

These as well as other aspects, advantages, and alternatives, will become apparent to those of ordinary skill in the art by reading the following detailed description, with reference where appropriate to the accompanying drawings.

DETAILED DESCRIPTION

Example processes and apparatuses are described herein. Any example or feature described herein is not necessarily to be construed as preferred or advantageous over other examples or features. The examples described herein are not meant to be limiting. It will be readily understood that certain aspects of the disclosed apparatuses and processes can be arranged and combined in a wide variety of different configurations, all of which are contemplated herein.

Furthermore, the particular arrangements shown in the Figures should not be viewed as limiting. It should be understood that other examples may include more or less of each element shown in a given Figure. Further, some of the illustrated elements may be combined or omitted. Yet further, an example may include elements that are not illustrated in the Figures.

As used herein, with respect to measurements, "about" means +/−10%.

Figure 1:
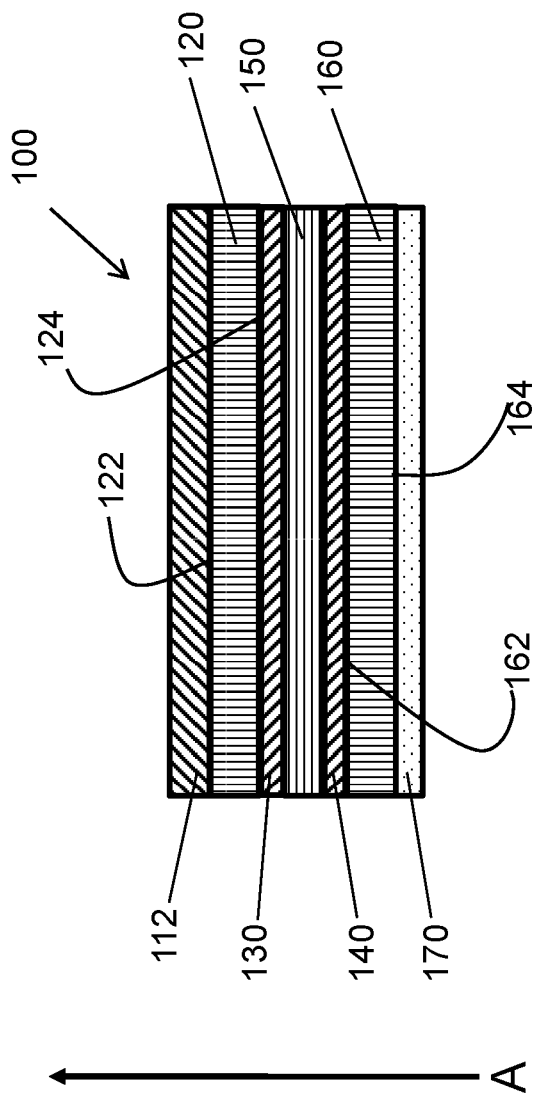
FIG. 1 is a cross-section view, not to scale, through a section of an exemplary visor. Arrow A indicates the direction of interior towards exterior of the helmet visor.

In one aspect, the electrochromic device is a visor for use on an extravehicular activity space helmet. FIG. 1 depicts such a visor 100. As shown in FIG. 1, visor 100 can be considered a laminate structure and includes an electrochromic apparatus 150 disposed between first and second layers of transparent material 120 and 160. In a visor for use with an extravehicular activity space helmet, first and second layers of transparent material 120 and 160 are typically a pair of concentric glass or polymer domes. Thus, in a helmet visor each of first and second layers of transparent material 120 and 160 are curved.

Figure 3:
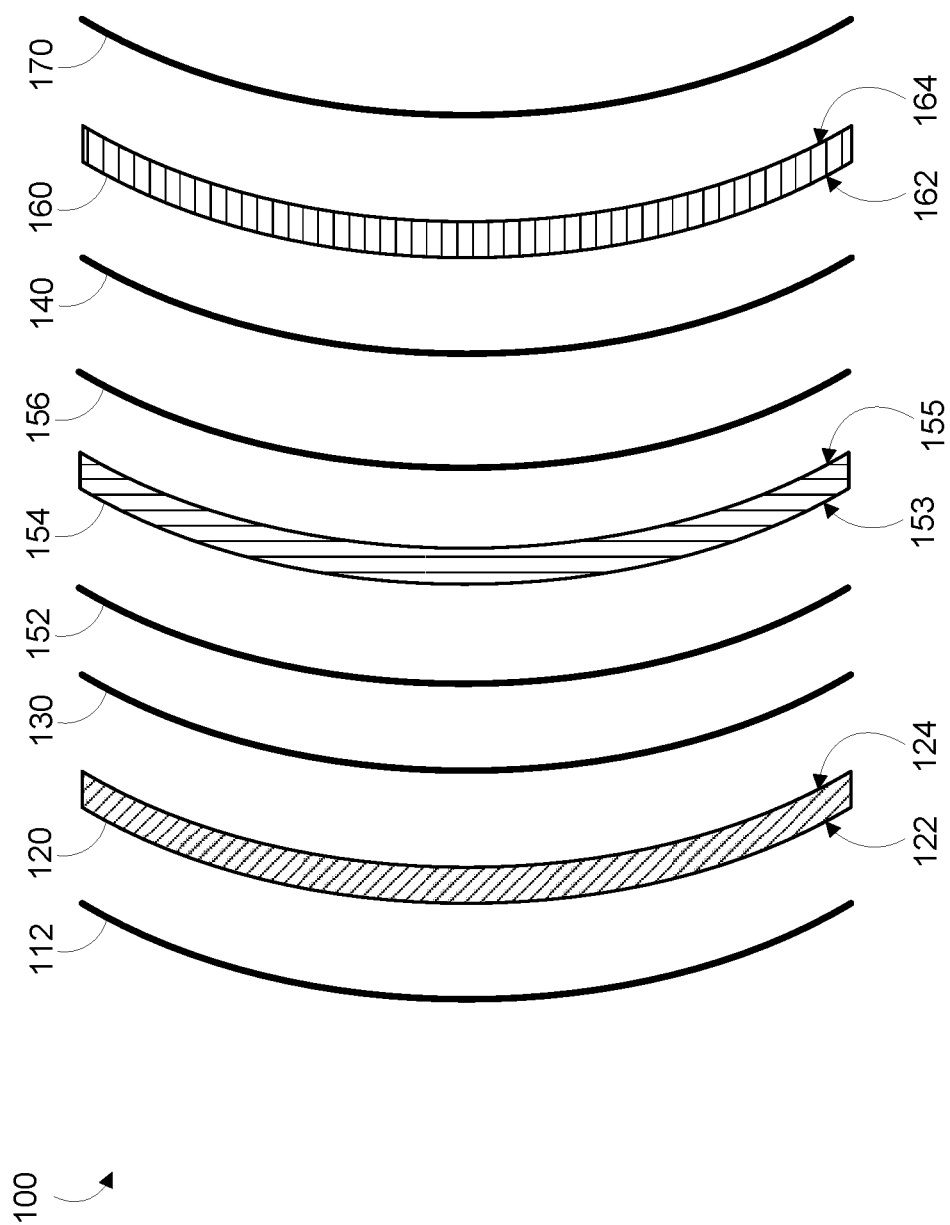
FIG. 3 is an exploded cross-sectional view of an exemplary visor.

FIG. 3 depicts the same elements of visor 100 in exploded view.

First transparent material layer 120 has outer surface 122 and inner surface 124. Similarly, second transparent material layer 160 has outer surface 164 and interior surface 162. The inner surfaces 124 and 162 face the electrochromic apparatus 150 but do not directly contact the electrochromic apparatus; they are separated from the electrochromic apparatus by transparent conducting electrodes 130 and 140. The transparent material of each of the first and second transparent material layers 120 and 160 is independently glass or thermoplastic polymer. In one example, the transparent material of each of layers 120 and 160 is the same and is a transparent polymer.

When the electrochromic device is intended for use as a window, e.g., as in a helmet visor, the refractive index of each of first and second transparent material layers 120 and 160 must match to prevent distortion. Thus, in certain examples, the first and second transparent material layers 120 and 160 are the same material.

In certain examples, the transparent polymer in first and second transparent material layers 120 and 160 is polycarbonate.

Figure 2:
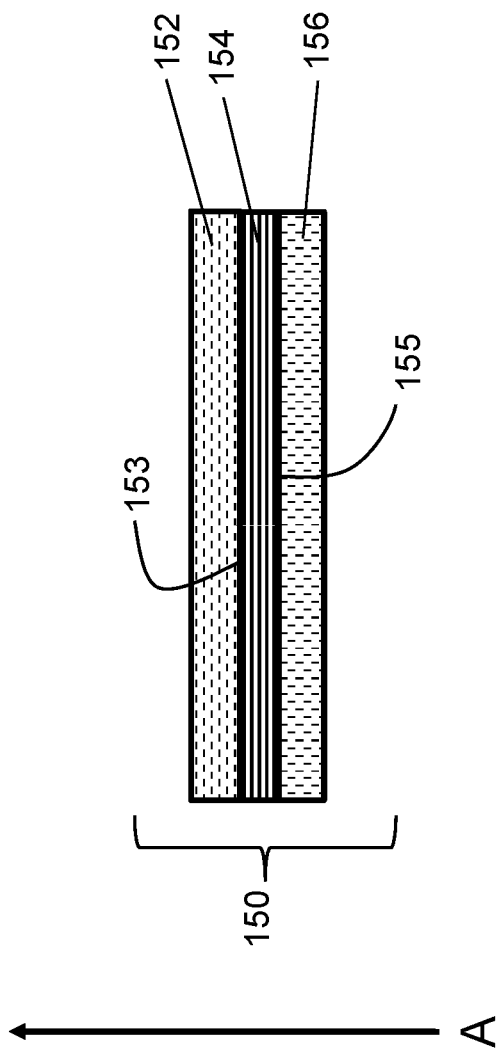
FIG. 2 is a cross-section view, not to scale, of a section of an exemplary electrochromic apparatus of this disclosure. Arrow A indicates the direction of interior towards exterior of the helmet visor.

As shown in FIG. 2, electrochromic apparatus 150 comprises an electrolyte membrane 154 having a membrane first surface 153 and a membrane second surface 155. In one example, at least one of membrane first surface 153 and membrane second surface 155 is in contact with an electrochromic compound. FIG. 2 depicts an electrochromic apparatus having electrochromic compound 152 and electrochromic compound 156 in contact respectively with membrane first surface 153 and membrane second surface 155.

The combination of electrochromic apparatus 150 and transparent conducting electrodes 130 and 140 forms an electrochromic cell. Such an electrochromic cell is colored/bleached by applying an external voltage pulse between the transparent conducting electrodes 130 and 140 on the two sides of electrochromic apparatus 150. Electrochromic compound 152 and/or electrochromic compound 156 will as a result undergo a color change.

Electrolyte membrane 154 is normally a gel and the terms "electrolyte membrane" and "gel membrane" are used herein synonymously. Aqueous electrolytes can hydrolyze electrolyte membranes and electrochromic compounds and consequently degrade the electrochromic apparatus. Electrolyte membrane 154 comprises a non-aqueous electrolyte and a polymer. The non-aqueous electrolyte comprises an ionic liquid. In other examples, the non-aqueous electrolyte is one or more ionic liquids and no additional electrolyte.

Ionic liquids are used in electrolyte membrane 154 because they are capable of moving through the electrolyte membrane with the application of an external voltage. In addition, ionic liquids are used herein permit refractive index matching between the electrolyte membrane and the other layers of the laminate, including first and second layers of transparent material 120 and 160. Further, ionic liquids permit the electrochromic device to be flexible and survive harsh conditions such as those found in space.

Suitable ionic liquids generally have a melting point of from about −80° C. to about 200° C. In certain examples the ionic liquid used herein has a melting point of from about −80° C. to about 25° C.

In one example, suitable ionic liquids for use herein comprise an anion selected from the group consisting of sulfates, alkylsulfates, arylsulfates, alkylsulfonates, fluorinated alkylsulfates, fluorinated alkylsulfonates, fluoroalkylsulfonylimides, hexafluorophosphate, tetracyanoborate, tetrafluoroborate, thiocyanate, thiosalicylate, dicyanamide, and halides.

Examples of fluorinated alkylsulfonates are triflate, i.e., trifluoromethane sulfonate, and a copolymer of tetrafluoroethylene and $CF_2=CF-O-(CF_2)_2-SO_3$, commercially available from Solvay as Aquivion® PW79S, and 3,3,4,4,5,5,6,6,7,7,8,8,8-tridecafluorooctane-1-sulfonate, commercially available from DuPont as Zonyl® FS-62.

An example of a fluoroalkylsulfonylimides is triflimide, i.e., (bis(trifluoromethyl-sulfonyl)imide).

In another example, suitable ionic liquids comprise a cation selected from the group consisting of imidazolium groups, pyridinium groups, pyrrolidinium groups, phosphonium groups, ammonium groups, 1,2,3-triazolium groups, benzothiazolium groups, trichloroaluminate, and sulfonium groups.

In still another example, the ionic liquid comprises an anion selected from the group consisting of sulfates, alkylsulfates, arylsulfates, alkylsulfonates, fluorinated alkylsulfates, fluorinated alkylsulfonates, fluoroalkylsulfonylimides, hexafluorophosphate, tetrafluoroborate, thiocyanate, thiosalicylate, dicyanamide, halides, and mixtures thereof, and a cation selected from the group consisting of imidazolium groups, pyridinium groups, pyrrolidinium groups, phosphonium groups, ammonium groups, 1,2,3-triazolium groups, benzothiazolium groups, trichloroaluminate, sulfonium groups, and mixtures thereof.

The ionic liquid can alternatively be an amphoteric compound, e.g., 4-(3-Butyl-1-imidazolio)-1-butanesulfonate, and may be used alone or in combination with the ionic liquids described above that include an anion and a cation.

Representative examples of suitable ionic liquid are:
1,2,3-Trimethylimidazolium methyl sulfate;
1,2,3-Trimethylimidazolium trifluoromethanesulfonate;
1,2-Dimethyl-3-propylimidazolium bis(trifluoromethylsulfonyl)imide;
1,2-Dimethyl-3-propylimidazolium tris(trifluoromethylsulfonyl)methide;
1,3-Dimethylimidazolium methyl sulfate;
1-Allyl-3-methylimidazolium chloride;
1-Benzyl-3-methylimidazolium chloride;
1-Benzyl-3-methylimidazolium hexafluorophosphate;
1-Benzyl-3-methylimidazolium tetrafluoroborate;
1-Butyl-1-(3,3,4,4,5,5,6,6,7,7,8,8,8-tridecafluorooctyl)imidazolium hexafluorophosphate;
1-Butyl-1-methylpyrrolidinium bis(trifluoromethylsulfonyl)imide
1-Butyl-1-methylpyrrolidinium bromide;
1-Butyl-1-methylpyrrolidinium chloride;
1-Butyl-1-methylpyrrolidinium dicyanamide;
1-Butyl-1-methylpyrrolidinium tetrafluoroborate;
1-Butyl-2,3-dimethylimidazolium chloride;
1-Butyl-2,3-dimethylimidazolium hexafluorophosphate;
1-Butyl-2,3-dimethylimidazolium tetrafluoroborate;
1-Butyl-3-methylimidazolium 2-(2-methoxyethoxy)ethyl sulfate;
1-Butyl-3-methylimidazolium acetate;
1-Butyl-3-methylimidazolium bis(trifluoromethylsulfonyl)imide;
1-Butyl-3-methylimidazolium bromide;
1-Butyl-3-methylimidazolium chloride;
1-Butyl-3-methylimidazolium dicyanamide;
1-Butyl-3-methylimidazolium hexafluoroantimonate;
1-Butyl-3-methylimidazolium hexafluorophosphate
1-Butyl-3-methylimidazolium hydrogen sulfate;
1-Butyl-3-methylimidazolium methanesulfonate;
1-Butyl-3-methylimidazolium methyl sulfate;
1-Butyl-3-methylimidazolium nitrate;
1-Butyl-3-methylimidazolium octyl sulfate;
1-Butyl-3-methylimidazolium tetrachloroaluminate;
1-Butyl-3-methylimidazolium tetrafluoroborate;
1-Butyl-3-methylimidazolium thiocyanate;
1-Butyl-3-methylimidazolium tosylate;
1-Butyl-3-methylimidazolium trifluoromethanesulfonate;
1-Butyl-3-methylpyridinium bis(trifluoromethylsulfonyl)imide
1-Butyl-4-methylpyridinium bromide;
1-Butyl-4-methylpyridinium chloride;
1-Butyl-4-methylpyridinium hexafluorophosphate;
1-Butyl-4-methylpyridinium tetrafluoroborate;
1-Butylpyridinium bromide;
1-(3-Cyanopropyl)-3-methylimidazolium bis(trifluoromethylsulfonyl)amide;
1-(3-Cyanopropyl)-3-methylimidazolium chloride;
1-Dodecyl-3-methylimidazolium iodide;
1-Ethyl-2,3-dimethylimidazolium chloride;
1-Ethyl-2,3-dimethylimidazolium ethyl sulfate;
1-Ethyl-2,3-dimethylimidazolium trifluoromethanesulfonate;
1-Ethyl-3-methylimidazolium acetate;
1-Ethyl-3-methylimidazolium bis(pentafluoroethylsulfonyl) Imide;
1-Ethyl-3-methylimidazolium bis(trifluoromethylsulfonyl) Imide;
1-Ethyl-3-methylimidazolium bromide;
1-Ethyl-3-methylimidazolium chloride;
1-Ethyl-3-methylimidazolium dicyanamide;
1-Ethyl-3-methylimidazolium ethyl sulfate;
1-Ethyl-3-methylimidazolium hexafluorophosphate;
1-Ethyl-3-methylimidazolium hydrogen sulfate;
1-Ethyl-3-methylimidazolium methanesulfonate;
1-Ethyl-3-methylimidazolium methyl sulfate;
1-Ethyl-3-methylimidazolium nitrate;
1-Ethyl-3-methylimidazolium tetrachloroaluminate;
1-ethyl-3-methylimidazolium tetracyanoborate;
1-Ethyl-3-methylimidazolium tetrafluoroborate;
1-Ethyl-3-methylimidazolium thiocyanate;
1-Ethyl-3-methylimidazolium tosylate;
1-Ethyl-3-methylimidazolium trifluoromethanesulfonate;
1-Ethyl-3-methylimidazolium 1,1,2,2-tetrafluoroethanesulfonate;
1-Hexyl-3-methylimidazolium chloride;
1-Hexyl-3-methylimidazolium hexafluorophosphate;
1-Hexyl-3-methylimidazolium tetracyanoborate;
1-Hexyl-3-methylimidazolium tetrafluoroborate;
1-Hexyl-3-methylimidazolium trifluoromethanesulfonate;
1-Hexyl-3-methylimidazolium trifluoromethanesulfonate;
1-Methyl-3-(3,3,4,4,5,5,6,6,7,7,8,8,8-tridecafluorooctyl) imidazolium hexafluorophosphate;
1-Methyl-3-octylimidazolium chloride;
1-Methyl-3-octylimidazolium hexafluorophosphate;
1-Methyl-3-octylimidazolium tetrafluoroborate;
1-Methyl-3-octylimidazolium trifluoromethanesulfonate;
1-Methylimidazolium chloride;
1-Methylimidazolium hydrogen sulfate;
3-(Triphenylphosphonio)propane-1-sulfonate;
3-(Triphenylphosphonio)propane-1-sulfonic acid tosylate;
3-Methyl-1-propylpyridinium bis(trifluoromethylsulfonyl)imide;
4-(3-Butyl-1-imidazolio)-1-butanesulfonate;
4-(3-Butyl-1-imidazolio)-1-butanesulfonic acid triflate;
Methyl-trioctylammonium bis(trifluoromethylsulfonyl)imide;
Tetrabutylammonium benzoate;
Tetrabutylammonium bis(trifluoromethylsulfonyl)imide;
Tetrabutylammonium bromide;
Tetrabutylammonium chloride;
Tetrabutylammonium heptadecafluorooctanesulfonate
Tetrabutylammonium methanesulfonate;
Tetrabutylammonium nonafluorobutanesulfonate;
Tetrabutylphosphonium bromide;
Tetrabutylphosphonium chloride;
Tetrabutylphosphonium methanesulfonate;
Tetrabutylphosphonium p-toluenesulfonate;
Tetrabutylphosphonium tetrafluoroborate;
Tetraethylammonium trifluoroacetate;
Tetraethylammonium trifluoromethanesulfonate;
Tetraheptylammonium bromide;
Tetraheptylammonium chloride;
Tetrahexylammonium bromide;
Tetrahexylammonium iodide;
Tetrahexylammonium tetrafluoroborate;
Tetraoctylammonium bromide;
Tetraoctylammonium chloride;
Tetrapentylammonium bromide;
Tetrapentylammonium thiocyanate;
Tributylhexadecylphosphonium bromide;

Tributylmethylammonium methyl sulfate;
Triethylsulfonium bis(trifluoromethylsulfonyl)imide
Trihexyltetradecylphosphonium bis(2,4,4-trimethylpentyl) phosphinate;
Trihexyltetradecylphosphonium bis(trifluoromethylsulfonyl)amide;
Trihexyltetradecylphosphonium bromide;
Trihexyltetradecylphosphonium chloride;
Trihexyltetradecylphosphonium decanoate;
Trihexyltetradecylphosphonium dicyanamide;
Trihexyltetradecylphosphonium hexafluorophosphate;
Trihexyltetradecylphosphonium tetrafluoroborate;
Triisobutylmethylphosphonium tosylate;
Trioctylmethylammonium thiosalicylate;
α-Cyano-4-hydroxycinnamic acid butylamine salt;
α-Cyano-4-hydroxycinnamic acid diethylamine salt; or
a mixture thereof.

Other suitable ionic liquids are described in Ionic Liquids—Classes And Properties, Handy ed., 2001, In Tech, Rijeka, Croatia.

Still other ionic liquids are disclosed in U.S. Patent Application Publication No. 20040077519A1.

In a particular example, the ionic liquid comprises a cation selected from the group consisting of imidazolium groups and phosphonium groups.

In another particular example, the ionic liquid comprises an anion selected from tetrafluoroborate and fluoroalkylsulfonylimides.

In still another particular example, the ionic liquid comprises an anion selected from tetrafluoroborate and fluoroalkylsulfonylimides.

In another particular example, the ionic liquid comprises an anion selected from tetrafluoroborate and bis(trifluoromethylsulfonyl)imide.

Electrolyte membrane 154 comprises from about 0.25 to about 35% by weight of the ionic liquid, based on the weight of the electrolyte membrane. Higher amounts of the ionic liquid can be incorporated if desired. However, higher amounts may lead to swelling of the membrane and undesirable mechanical and physical properties such as insufficient elastic modulus, refractive index, and electrical conductivity.

In certain examples, the amount of the ionic liquid in electrolyte membrane 154 is from about 1% to about 10%, or about 5 to about 15%, or about 10 to about 20%, or about 15 to about 25%, or about 20 to about 30%, or about 25 to about 35% by weight of the cured electrolyte membrane.

Representative suitable polymers for making electrolyte membrane 154 include thermoplastic polymers, silicones, silicone polyethers, silicone acrylics, polyacrylates, polyethylene oxides, fluorine resins, vinylidene fluoride-based fluorine rubbers, or epoxy resins.

Examples of suitable polymers for forming the electrolyte membrane include polymers such as polyvinylidene difluoride and poly(vinylidene fluoride-co-hexafluoropropylene).

In one example, at least one of the membrane first surface 153 and the membrane second surface 155 is in contact with an electrochromic compound. The electrochromic apparatus depicted in FIG. 2 has an electrochromic compound (152, 156) in contact with both membrane first surface 153 and membrane second surface 155. In certain examples, only membrane first surface 153 is in contact with an electrochromic compound (152), while in other examples, only membrane second surface 155 is in contact with an electrochromic compound (156).

Electrochromic compounds are available for various commercial sources and can be prepared according to the literature procedures. Representative suitable electrochromic compounds for use herein include those of the following formulae:

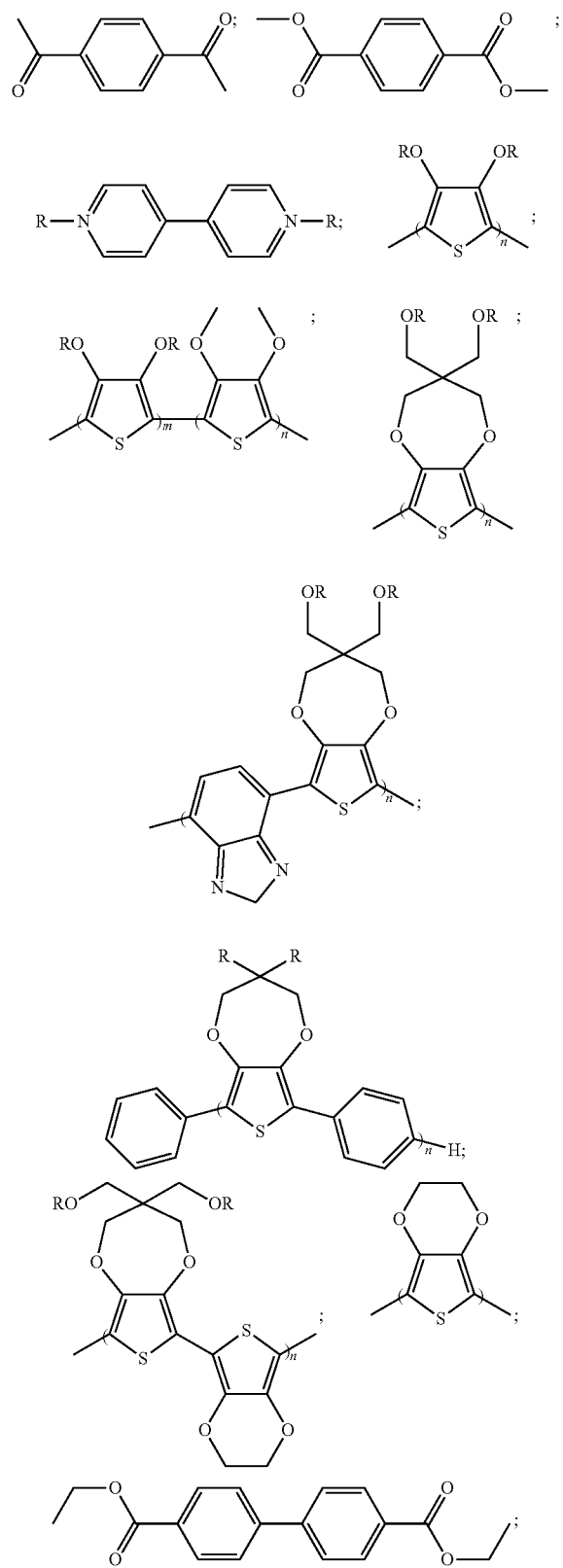

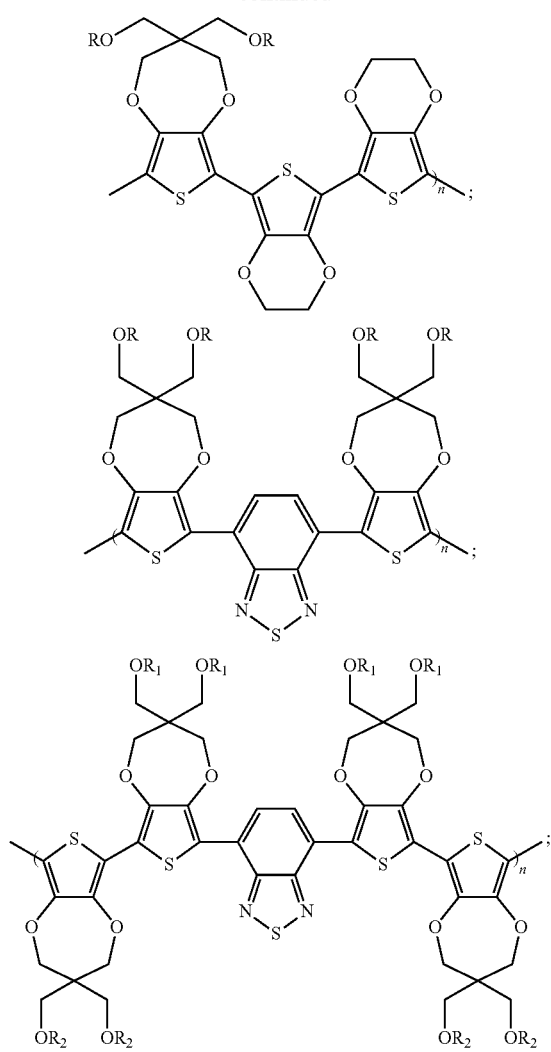

wherein each R, $R_1$ and $R_2$ is independently $C_1$-$C_8$ alkyl; or a compound of Formula A

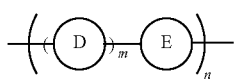

(A)

wherein D represents

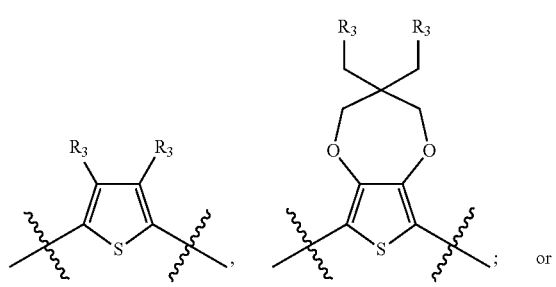

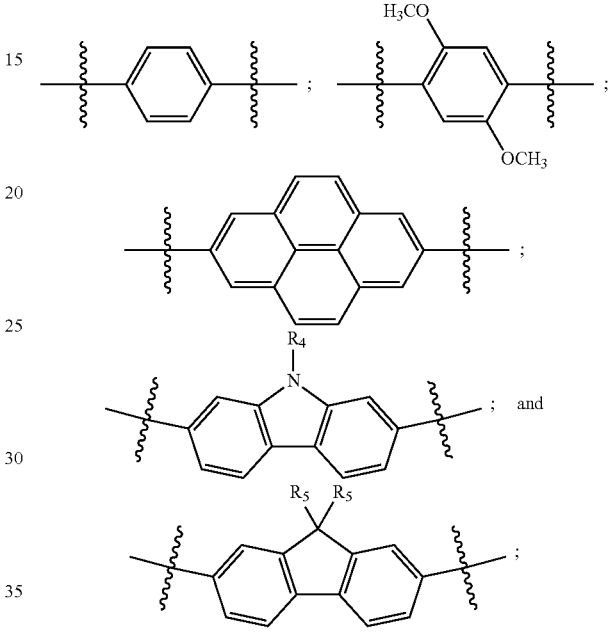

and E represents wherein each $R_3$, $R_4$, and $R_5$ is independently $C_1$-$C_8$ alkyl; and m and n are 1 or 2.

In certain examples of the helmet visor disclosed herein, each of inner surfaces 124 and 162 of the glass or thermoplastic polymer comprises a transparent conducting layer. In an example, transparent conducting layer 130 is provided on inner surface 124 of first transparent material 120, and transparent conducting layer 160 is provided on inner surface 162 of second transparent material 120. Typical transparent conducting layers include transparent conducting oxides.

Suitable transparent conducting layers 130 and 140 have a sheet resistivity sufficient for electrical connection to the electrochromic device therefore permitting electronic control of the device. Representative transparent conducting layers 130 and 140 have a sheet resistivity, when measured using conventional methods, of less than 100 Ω/square at about +80% T. Transparent conducting layers 130 and 140 are typically electrically connected via leads (not shown) to a user-controllable variable voltage source.

In some situations, the material used to form transparent conducting layers 130 and 140 is indium tin oxide (ITO), which may be formed using, for example, a magnetron sputtering apparatus with an indium target and a tin target can be used to deposit a layer of indium and tin on the layer of the electrically non-conductive material. A source of oxygen (e.g., $O_2$) can be provided to deposit oxygen into the layer of indium and tin.

As is shown in FIG. 1, in certain examples, outer surface 122 of helmet visor 100 includes a layer of dielectric material 112 (hereinafter "dielectric layer 112) capable of transmitting light within the visible range, i.e., about 400 nm to 700 nm. Electrochromic compounds can be undesirably impacted by certain wavelengths of solar radiation. Their use therefore in visors on space helmets is limited due to decomposition of the electrochromic compounds. Dielectric layer 112 is provided to absorb or reflect ultraviolet and infrared electromagnetic radiation and as a result protect electrochromic compounds and 152 and 156 and electrochromic apparatus 150 from degradation. Dielectric layer 112 can be a single dielectric material or a mixture of dielectric materials.

Examples of suitable dielectric materials for use in dielectric layer 112 are Zinc Sulfide (ZnS), Sodium Aluminum Fluoride ("cryolite" or $Na_3AlF_6$), silica ($SiO_2$), tantala ($Ta_2O_6$), and niobia ($Nb_2O_5$). These materials can be applied individually or in combination in multilayer stacks to form dielectric layer 112 and modulate transmission and reflection of electromagnetic radiation. Dielectric layer 112 can be conveniently applied using a magnetron sputtering apparatus.

In certain examples, outer surface 122 of the first layer of transparent material 120 is provided with a layer of dielectric material 112 capable of blocking radiation outside of about 400-700 nm.

In an example, dielectric layer 112 is transparent and is capable of reflecting infrared and ultraviolet wavelength electromagnetic radiation. Thus, dielectric layer 112 is capable of reflecting electromagnetic radiation having a wavelength of from about 700 nm to about to 1 mm (infrared) and electromagnetic radiation having wavelength of from about 10 nm to 400 nm.

In another example, dielectric layer 112 is transparent and is capable of blocking blocks wavelengths of visible radiation capable of initiating chemical decomposition of the electrochromic compound.

In certain examples, dielectric layer 112 contains a single dielectric material capable of transmitting at wavelengths as high as possible in the visible range, i.e., between 400-700 nm, and blocking wavelengths outside of that range.

In certain examples, dielectric layer 112 contains two or more dielectric materials, wherein one is capable of transmitting at wavelengths as high as possible between 400-700 nm and the other is capable of blocking wavelengths outside of that range.

In other examples, dielectric layer 112 is a single material capable of blocking wavelengths of visible radiation capable of initiating chemical decomposition of the electrochromic compound, transmitting at wavelengths as high as possible between 400-700 nm and blocking wavelengths outside of that range. Dielectric layer 112 as a result blocks electromagnetic radiation that may overload and overheat the electrochromic compound leading to decomposition and degradation of the electrochromic compound.

In still other examples, dielectric layer 112 includes 2 or more materials such that dielectric layer 112 is capable of blocking blocks wavelengths of visible radiation capable of initiating chemical decomposition of the electrochromic compound, transmitting at wavelengths as high as possible between 400-700 nm and blocking wavelengths outside of that range.

In certain examples, exterior surface 164 of the second curved layer of transparent material is provided with a layer 170 of anti-reflective coating.

In certain examples, helmet visor 100 is a component of a helmet configured and adapted for connection to a pressure suit suitable for extra vehicular activity in outer space. In certain examples, the helmet further comprises a coupling mechanism for hermetically securing the helmet to a pressure suit.

In certain examples, helmet visor 100 further comprises a gold coating on the exterior of dielectric layer 112. The gold coating is a high-strength coating and can protect various layers of helmet visor 100 from wear caused by impact or scratches from, for example, particles carried on the solar wind. In certain examples, the gold coating is resistant to scratches from handling and impacts from particles.

As noted above, in one aspect, this disclosure provides a helmet comprising a visor comprising an electrochromic device, wherein the electrochromic device comprises an electrochromic apparatus disposed between first and second curved layers of transparent material, and the first and second curved layers have exterior and inner surfaces, wherein the inner surfaces face the electrochromic apparatus. In an example of such a helmet, the exterior surface of the first curved layer of transparent material is provided with a dielectric material capable of transmitting light within a range of about 400 nm to 700 nm. In another example of such a helmet, wherein the exterior surface of the first curved layer of transparent material is provided with a dielectric material capable of blocking radiation outside of about 400-700 nm. In still another example of such a helmet, wherein the exterior surface of the second curved layer of transparent material is provided with an anti-reflective coating.

As noted above, this disclosure provides processes for manufacturing a helmet visor comprising an electrochromic apparatus disposed between first and second curved layers of transparent material. The processes includes several intermediate processes.

In certain examples of processes for manufacturing the visors disclosed herein, two concentrically sized polycarbonate domes are employed. The outer dome has an inner diameter greater than the outer diameter of the inner dome such that the inner dome can be mated with the outer dome with the electrochromic apparatus positioned therebetween. The resulting curved structure or visor includes a user-controllable apparatus for adjusting the color perceived by the wearer.

Figure 4:
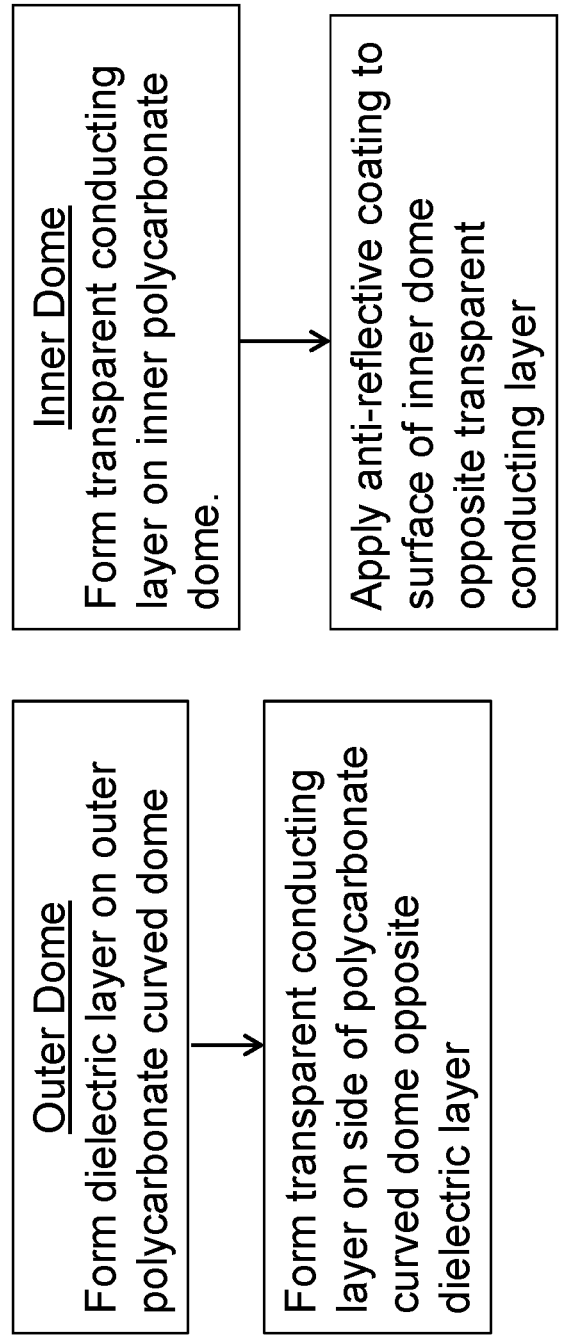
FIG. 4 is a flow chart illustrating an exemplary method for manufacturing an electrochromic device having a dielectric layer.
Figure 5:
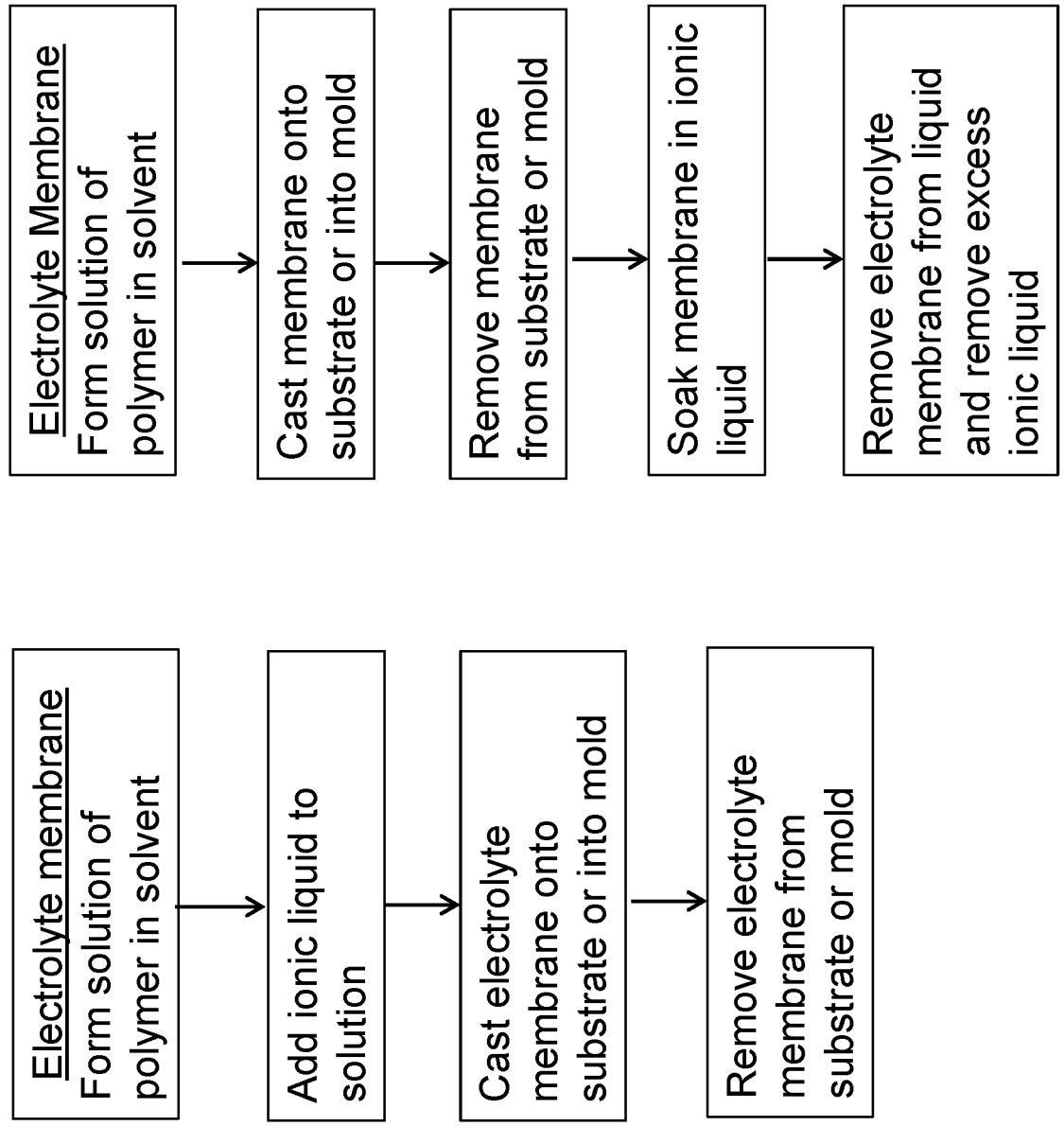
FIG. 5 is a flowchart illustrating an intermediate processes for forming an exemplary electrolyte membrane.
Figure 6:
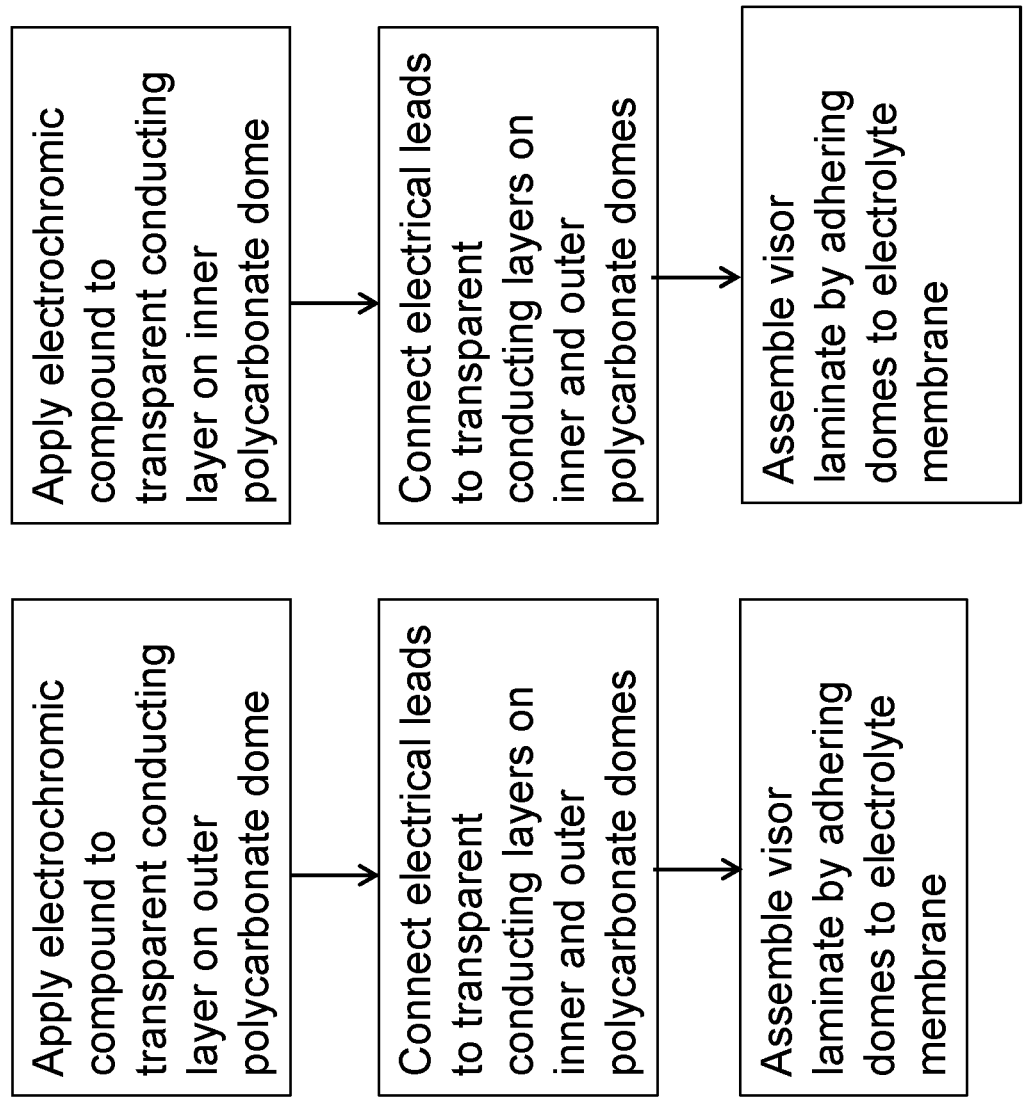
FIG. 6 is a flowchart illustrating exemplary methods for applying electrochromic compound(s) onto an electrolyte membrane and assembling an exemplary visor.
Figure 7:
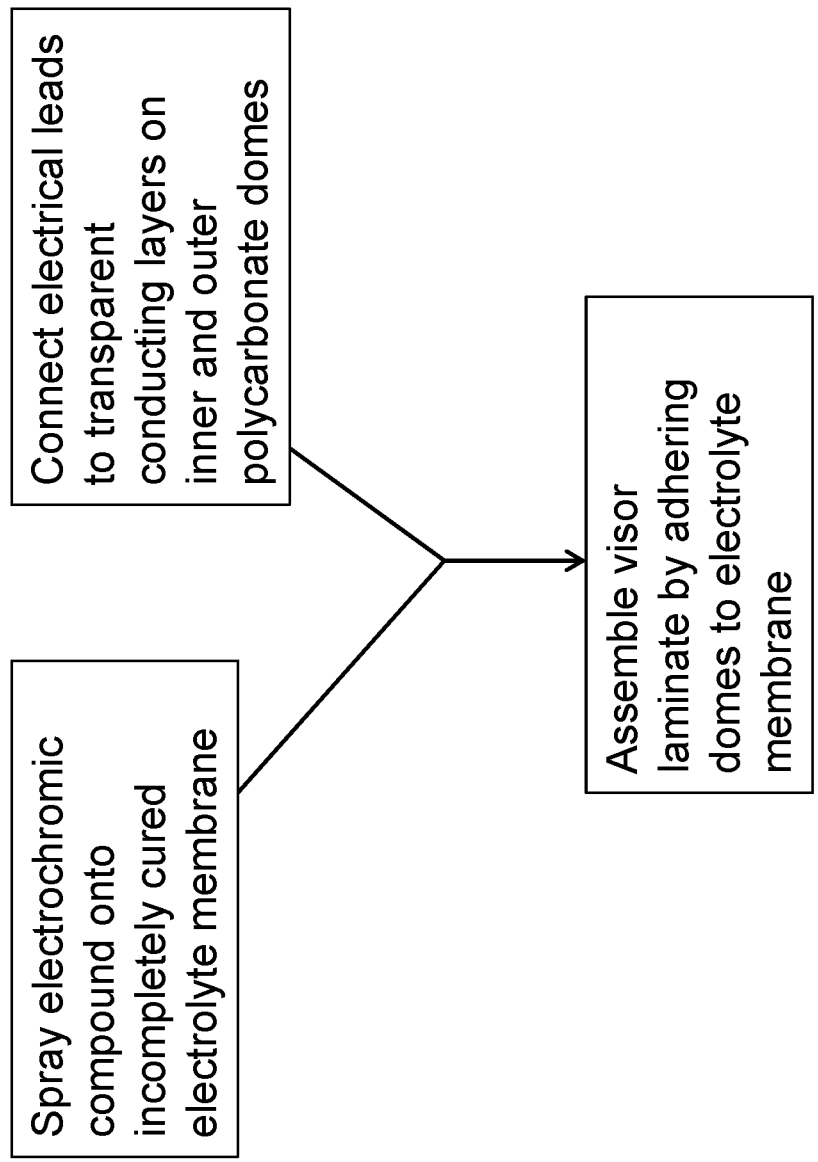
FIG. 7 is a flowchart illustrating an exemplary method for applying electrochromic compound onto an electrolyte membrane and assembling an exemplary visor.

Representative exemplary intermediate process phases for manufacturing visor 100 are illustrated in FIG. 4 and explained below. FIG. 4 depicts separate intermediate processes for making the outer dome and the inner dome. FIG. 5 illustrates alternative intermediate processes for forming the electrolyte membrane. FIG. 6 depicts alternative methods for incorporating the electrochromic compound(s) and assembling visor 100. FIG. 7 illustrates another alternative for applying the electrochromic compound onto the electrolyte membrane and assembling visor 100.

As shown in FIG. 4, Dielectric layer 112 of one or more dielectric layer materials is typically first formed on the outer surface 122 of the outer polycarbonate dome using a flat source magnetron sputtering apparatus. Following this, procedure, a layer of transparent indium tin oxide (ITO) is applied to the inner surface 124 of the outer shell using a magnetron sputtering apparatus. The order of these operations may be switched, if necessary, depending on the nature of the dielectric material(s). Alternatively, multiple layers of different dielectric materials may be used.

The inner dome is made by applying a layer of transparent indium tin oxide to surface 162. Surface 162 is identified above as inner surface 162. Surface 162 will face the outer dome after assembly.

An anti-reflective coating is subsequently applied to the surface 164 the inner dome; Surface 164 will face the wearer of helmet during use.

Polymer material for making the electrolyte membrane may be synthesized or obtained from commercial sources and used as is. Alternatively, polymer may be made in situ in the presence of an ionic liquid and/or a crosslinking agent.

In situations wherein the polymer is obtained from a commercial source of synthesized prior to use, it is dissolved in a suitable solvent to produce a solution having from about 10-30%, preferably about 15-20%, by weight of the polymer. To the solution is then added the ionic liquid to form a solution having from about 1-5% by weight of the ionic liquid. Solvents suitable for this process are those that dissolve both the polymer and the ionic liquid. For example, when the polymer is polyvinylidene difluoride (PVDF), the solvent may be Dimethylformamide (DMF) or Dimethylacetamide (DMA). When the polymer is Poly(vinylidene fluoride-co-hexafluoropropylene (PVDF-HFP), suitable solvents include acetone and tetrahydrofuran (THF).

The electrolyte membrane containing the ionic liquid is solution cast onto a non-stick surface, e.g., Teflon®. The surface may be within a suitable mold.

Alternatively, an electrolyte membrane may be made by first making a cured polymer membrane and subsequently soaking the membrane in an ionic liquid.

The electrochromic compound may be applied to the electrolyte membrane or to the transparent conducting oxide layer on the domes.

Preferably, the electrochromic compound is applied to an electrolyte membrane prior to complete cure of the membrane. This may be accomplished by spraying an incompletely cured electrolyte membrane, i.e., a membrane which is substantially gelled but substantially tacky, with an ionic liquid. In this fashion, the ionic liquid becomes part of the external surface of the electrolyte membrane. The membrane and electrochromic layer are then permitted to completely cure, In certain examples, complete cure means, for example, that the membrane is no longer tacky.

Electrical leads can be connected to the transparent conducting layer. The leads are electrically connected to a user-controllable variable voltage source for use by the wearer to adjust the color generated by the electrochromic compound(s) and, as a result, the change the color perceived by the wearer of the environment.

Final assembly of the helmet visor can include applying adhesive to the edges of the domes or to the edges of the electrolyte membrane and subsequently adhering the layers together to form the final laminar structure.

The above detailed description describes various features and functions of the disclosed apparatus and methods with reference to the accompanying figures. While various aspects and examples have been disclosed herein, other aspects and examples will be apparent to those skilled in the art. All examples within and between different aspects of the invention may be combined unless the context clearly dictates otherwise. The various aspects and examples disclosed herein are for purposes of illustration and are not intended to be limiting, with the true scope and spirit being indicated by the following claims.

EXAMPLES

Those having skill in the art will recognize that the materials and conditions disclosed in the following examples may be varied, the sequence of the procedures altered, or additional processes employed to produce devices encompassed by the current disclosure.

Example 1

Manufacture of Visor Domes

The helmet visor is manufactured using two concentric polycarbonate domes, the outer dome having an diameter greater than the diameter of the inner dome.

A dielectric layer is first formed on the outer surface of the outer polycarbonate dome using a flat source magnetron sputtering apparatus.

A layer of transparent indium tin oxide (ITO) is next applied to the inside of the outer shell using a magnetron sputtering apparatus.

A layer of transparent indium tin oxide is then also applied to the inner surface of inner shell. The inner surface faces the outer dome.

An anti-reflective coating is subsequently applied to the outer layer of the inner shell, i.e., the layer that faces the wearer of helmet.

Example 2

Preparation of Ionic Liquid-Containing Electrolyte Membrane

Polyvinylidene difluoride (PVDF) is dissolved in Dimethylformamide (DMF) to form a mixture containing about 15-20% by weight PVDF.

1-5% (by weight) 1-ethyl-3-methylimidazolium tetracyanoborate is added to the PVDF/DMF solution and thoroughly mixed.

The ionic liquid/polymer/DMF solution is then cast using a non-stick mold and allowed to completely cure. Heating the composition membrane at about 70° C. for several hours is typically sufficient to evaporate all the DMF. The mold can be a non-stick surface or an open-top mold. Where the mold is an open-top mold, it is appropriate dimensions to form a membrane corresponding in size to the domes.

After curing, the electrolyte membrane is removed from the non-stick mold.

Example 3

Preparation of Ionic Liquid-Containing Membrane

Poly(vinylidene fluoride-co-hexafluoropropylene (PVDF-HFP) is dissolved in acetone to form a mixture containing about 15-20% by weight PVDF-HFP.

1-5% (by weight) 1-Ethyl-3-methylimidazolium bis(trifluoromethylsulfonyl)imide is added to the PVDF-HFP/acetone solution and thoroughly mixed.

The ionic liquid/polymer/acetone solution is then cast using a non-stick mold and the solvent allowed to evaporate at ambient temperature (about 25° C.) for 24 hours. The membrane is subsequently heated at about 70° C. for several hours to completely remove any remaining solvent. The mold can be a non-stick surface or an open-top mold. Where the mold is an open-top mold, it is appropriate dimensions to form a membrane corresponding in size to the domes.

After curing, the electrolyte membrane is removed from the non-stick mold.

Example 4

Preparation of Ionic Liquid-Containing Electrolyte Membrane

A PVDF membrane is prepared by solvent casting from acetone as above in Example 3, but without the ionic liquid. The resulting membrane is then soaked in 1-Ethyl-3-methylimidazolium hexafluorophosphate for about 48 hours. The membrane containing 1-Ethyl-3-methylimidazolium hexafluorophosphate is removed from the liquid, dried by contacting the membrane with a cloth or other absorbent material and stored for later use.

Example 5

Preparation of Ionic Liquid-Containing Membrane with Electrochromic Compound Layer A PVDF-HFP/acetone solution is prepared to contain 1-Ethyl-3-methylimidazolium bis(trifluoromethylsulfonyl) imide according to Example 3 above and added to a mold. Prior to complete cure of the membrane, an electrochromic compound (poly(3,4-ethylenedioxythiophene) (PEDOT)) is be sprayed onto the exposed surface of the membrane and the membrane and electrochromic layer permitted to completely cure.

Example 6

Preparation of Ionic Liquid-Containing Membrane with Electrochromic Compound Layer A PVDF membrane is prepared to contain 1-ethyl-3-methylimidazolium tetracyanoborate according to Example 2 above and added to a mold. Following complete cure of the electrolyte membrane and removal from the mold, an electrochromic compound (poly(3,4-ethylenedioxythiophene) (PEDOT)) is be sprayed onto both sides of the membrane and the membrane and electrochromic layer permitted to cure.

Example 7

Preparation of Electrochromic Compound Layer Directly on Visor Dome

Electrochromic compound (PEDOT) is sprayed directly onto the inside ITO coating of the outer dome. In addition, where dual electrochromic layers are required, the same or different material is onto the ITO coating of the inner dome.

Example 8

Visor Assembly

A electrolyte membrane with a layer of electrochromic compound is prepared essentially according to the procedure of Example 5 but not completely cured. The electrolyte membrane is applied to the ITO-containing (inner) surface of an outer dome made according to Example 1. Still prior to complete cure of the gel, the ITO-containing surface of an inner dome made according to Example 1 is applied to the exposed surface of the electrolyte membrane. The electrolyte membrane completely cures after the respective parts of the visor are connected with each other and, as a result, forms a laminate of the domes and the electrolyte membrane.

Electrical connections to the electrochromic layer(s) are made to electrical leads during visor assembly.

Example 9

Visor Assembly

A completely cured electrolyte membrane with a layer of electrochromic compound is prepared according to the procedure of Example 4. A strip of adhesive is applied to the periphery of the ITO-containing surface of an outer dome made according to Example 1. The electrolyte membrane is applied to the ITO-containing (inner) surface of the outer dome and adhered using the adhesive. A strip of adhesive is applied to the ITO-containing surface of an inner dome made according to Example 1 and subsequently applied to the exposed surface of the electrolyte membrane that is adhered to the outer dome.

Example 10

Visor Assembly

A completely cured electrolyte membrane with a layer of electrochromic compound is prepared according to the procedure of Example 4. A layer of adhesive is applied to the ITO-containing surface of an outer dome made according to Example 1. The adhesive has a refractive index that matches the refractive index of the inner and outer polycarbonate domes. The electrolyte membrane is then adhered to the ITO-containing (inner) surface of the outer dome. A layer of adhesive is also applied to the ITO-containing surface of an inner dome made according to Example 1. The inner dome is then affixed to the exposed surface of the electrolyte membrane that is adhered to the outer dome.

The above detailed description describes various features and functions of the disclosed apparatus and methods with reference to the accompanying figures. While various aspects and examples have been disclosed herein, other aspects and examples will be apparent to those skilled in the art. All examples within and between different aspects of the invention may be combined unless the context clearly dictates otherwise. The various aspects and examples disclosed herein are for purposes of illustration and are not intended to be limiting, with the true scope and spirit being indicated by the following claims.

What is claimed is:

1. An electrochromic device having a layer of transparent polymeric material connected to an electrochromic apparatus, wherein the transparent polymeric material comprises
   a coating opposite the electrochromic apparatus and that is capable of reflecting infrared and ultraviolet wavelength radiation;
   a coating opposite the electrochromic apparatus and blocks wavelengths of visible radiation capable of initiating chemical decomposition of an electrochromic compound; or
   a dielectric coating capable of transmitting light within the range of about 400 nm to 700 nm.

2. An electrochromic device according to claim 1, wherein the transparent polymeric material is a thermoplastic polymer.

3. An electrochromic device according to claim 1, wherein the electrochromic apparatus comprises an electrolyte membrane comprising a non-aqueous electrolyte and a polymer, and the electrolyte membrane has a membrane first surface and a membrane second surface.

4. An electrochromic device according to claim 3, wherein the non-aqueous electrolyte is an ionic liquid.

5. An electrochromic device according to claim 4, wherein the ionic liquid comprises an anion selected from the group consisting of sulfates, alkylsulfates, arylsulfates, alkylsulfonates, fluorinated alkylsulfates, fluorinated alkylsulfonates, fluoroalkylsulfonylimides, hexafluorophosphate, tetracyanoborate, tetrafluoroborate, thiocyanate, thiosalicylate, dicyanamide, and halides.

6. An electrochromic device according to claim 4, wherein the ionic liquid comprises a cation selected from the group consisting of imidazolium groups, pyridinium groups, pyrrolidinium groups, phosphonium groups, ammonium groups, 1,2,3-triazolium groups, benzothiazolium groups, trichloroaluminate, and sulfonium groups.

7. An electrochromic device according to claim 4, wherein the ionic liquid is an amphoteric compound.

8. An electrochromic device according to claim 4, wherein the ionic liquid is 1,2,3-Trimethylimidazolium methyl sulfate;
1,2,3-Trimethylimidazolium trifluoromethanesulfonate;
1,2-Dimethyl-3-propylimidazolium bis(trifluoromethylsulfonyl)imide;
1,2-Dimethyl-3-propylimidazolium tris(trifluoromethylsulfonyl)methide;
1,3-Dimethylimidazolium methyl sulfate;
1-Allyl-3-methylimidazolium chloride;
1-Benzyl-3-methylimidazolium chloride;
1-Benzyl-3-methylimidazolium hexafluorophosphate;
1-Benzyl-3-methylimidazolium tetrafluoroborate;
1-Butyl-1-(3,3,4,4,5,5,6,6,7,7,8,8-tridecafluorooctyl) imidazolium hexafluorophosphate;
1-Butyl-1-methylpyrrolidinium bis(trifluoromethylsulfonyl)imide
1-Butyl-1-methylpyrrolidinium bromide;
1-Butyl-1-methylpyrrolidinium chloride;
1-Butyl-1-methylpyrrolidinium dicyanamide;
1-Butyl-1-methylpyrrolidinium tetrafluoroborate;
1-Butyl-2,3-dimethylimidazolium chloride;
1-Butyl-2,3-dimethylimidazolium hexafluorophosphate;
1-Butyl-2,3-dimethylimidazolium tetrafluoroborate;
1-Butyl-3-methylimidazolium 2-(2-methoxyethoxy)ethyl sulfate;
1-Butyl-3-methylimidazolium acetate;
1-Butyl-3-methylimidazolium bis(trifluoromethylsulfonyl)imide;
1-Butyl-3-methylimidazolium bromide;
1-Butyl-3-methylimidazolium chloride;
1-Butyl-3-methylimidazolium dicyanamide;
1-Butyl-3-methylimidazolium hexafluoroantimonate;
1-Butyl-3-methylimidazolium hexafluorophosphate
1-Butyl-3-methylimidazolium hydrogen sulfate;
1-Butyl-3-methylimidazolium methanesulfonate;
1-Butyl-3-methylimidazolium methyl sulfate;
1-Butyl-3-methylimidazolium nitrate;
1-Butyl-3-methylimidazolium octyl sulfate;
1-Butyl-3-methylimidazolium tetrachloroaluminate;
1-Butyl-3-methylimidazolium tetrafluoroborate;
1-Butyl-3-methylimidazolium thiocyanate;
1-Butyl-3-methylimidazolium tosylate;
1-Butyl-3-methylimidazolium trifluoromethanesulfonate;
1-Butyl-3-methylpyridinium bis(trifluoromethylsulfonyl)imide
1-Butyl-4-methylpyridinium bromide;
1-Butyl-4-methylpyridinium chloride;
1-Butyl-4-methylpyridinium hexafluorophosphate;
1-Butyl-4-methylpyridinium tetrafluoroborate;
1-Butylpyridinium bromide;
1-(3-Cyanopropyl)-3-methylimidazolium bis(trifluoromethylsulfonyl)amide;
1-(3-Cyanopropyl)-3-methylimidazolium chloride;
1-Dodecyl-3-methylimidazolium iodide;
1-Ethyl-2,3-dimethylimidazolium chloride;
1-Ethyl-2,3-dimethylimidazolium ethyl sulfate;
1-Ethyl-2,3-dimethylimidazolium trifluoromethanesulfonate;
1-Ethyl-3-methylimidazolium acetate;
1-Ethyl-3-methylimidazolium bis(pentafluoroethylsulfonyl)Imide;
1-Ethyl-3-methylimidazolium bis(trifluoromethylsulfonyl)Imide;
1-Ethyl-3-methylimidazolium bromide;
1-Ethyl-3-methylimidazolium chloride;
1-Ethyl-3-methylimidazolium dicyanamide;
1-Ethyl-3-methylimidazolium ethyl sulfate;
1-Ethyl-3-methylimidazolium hexafluorophosphate;
1-Ethyl-3-methylimidazolium hydrogen sulfate;
1-Ethyl-3-methylimidazolium methanesulfonate;
1-Ethyl-3-methylimidazolium methyl sulfate;
1-Ethyl-3-methylimidazolium nitrate;
1-Ethyl-3-methylimidazolium tetrachloroaluminate;
1-ethyl-3-methylimidazolium tetracyanoborate;
1-Ethyl-3-methylimidazolium tetrafluoroborate;
1-Ethyl-3-methylimidazolium thiocyanate;
1-Ethyl-3-methylimidazolium tosylate;
1-Ethyl-3-methylimidazolium trifluoromethanesulfonate;
1-Ethyl-3-methylimidazolium 1,1,2,2-tetrafluoroethanesulfonate;
1-Hexyl-3-methylimidazolium chloride;
1-Hexyl-3-methylimidazolium hexafluorophosphate;
1-Hexyl-3-methylimidazolium tetracyanoborate;
1-Hexyl-3-methylimidazolium tetrafluoroborate;
1-Hexyl-3-methylimidazolium trifluoromethanesulfonate;
1-Hexyl-3-methylimidazolium trifluoromethanesulfonate;
1-Methyl-3-(3,3,4,4,5,5,6,6,7,7,8,8-tridecafluorooctyl) imidazolium hexafluorophosphate;
1-Methyl-3-octylimidazolium chloride;
1-Methyl-3-octylimidazolium hexafluorophosphate;
1-Methyl-3-octylimidazolium tetrafluoroborate;
1-Methyl-3-octylimidazolium trifluoromethanesulfonate;
1-Methylimidazolium chloride;
1-Methylimidazolium hydrogen sulfate;
3-(Triphenylphosphonio)propane-1-sulfonate;
3-(Triphenylphosphonio)propane-1-sulfonic acid tosylate;
3-Methyl-1-propylpyridinium bis(trifluoromethylsulfonyl)imide;
4-(3-Butyl-1-imidazolio)-1-butanesulfonate;
4-(3-Butyl-1-imidazolio)-1-butanesulfonic acid triflate;
Methyl-trioctylammonium bis(trifluoromethylsulfonyl)imide;
Tetrabutylammonium benzoate;
Tetrabutylammonium bis(trifluoromethylsulfonyl)imide;
Tetrabutylammonium bromide;
Tetrabutylammonium chloride;
Tetrabutylammonium heptadecafluorooctanesulfonate
Tetrabutylammonium methanesulfonate;
Tetrabutylammonium nonafluorobutanesulfonate;
Tetrabutylphosphonium bromide;
Tetrabutylphosphonium chloride;
Tetrabutylphosphonium methanesulfonate;
Tetrabutylphosphonium p-toluenesulfonate;
Tetrabutylphosphonium tetrafluoroborate;
Tetraethylammonium trifluoroacetate;
Tetraethylammonium trifluoromethanesulfonate;
Tetraheptylammonium bromide;
Tetraheptylammonium chloride;

Tetrahexylammonium bromide;
Tetrahexylammonium iodide;
Tetrahexylammonium tetrafluoroborate;
Tetraoctylammonium bromide;
Tetraoctylammonium chloride;
Tetrapentylammonium bromide;
Tetrapentylammonium thiocyanate;
Tributylhexadecylphosphonium bromide;
Tributylmethylammonium methyl sulfate;
Triethylsulfonium bis(trifluoromethylsulfonyl)imide
Trihexyltetradecylphosphonium bis(2,4,4-trimethylpentyl)phosphinate;
Trihexyltetradecylphosphonium bis(trifluoromethylsulfonyl)amide;
Trihexyltetradecylphosphonium bromide;
Trihexyltetradecylphosphonium chloride;
Trihexyltetradecylphosphonium decanoate;
Trihexyltetradecylphosphonium dicyanamide;
Trihexyltetradecylphosphonium hexafluorophosphate;
Trihexyltetradecylphosphonium tetrafluoroborate;
Triisobutylmethylphosphonium tosylate;
Trioctylmethylammonium thiosalicylate;
α-Cyano-4-hydroxycinnamic acid butylamine salt;
α-Cyano-4-hydroxycinnamic acid diethylamine salt; or
a mixture thereof.

9. An electrochromic device according to claim 8, wherein the electrochromic compound is a compound of any of the following formula:

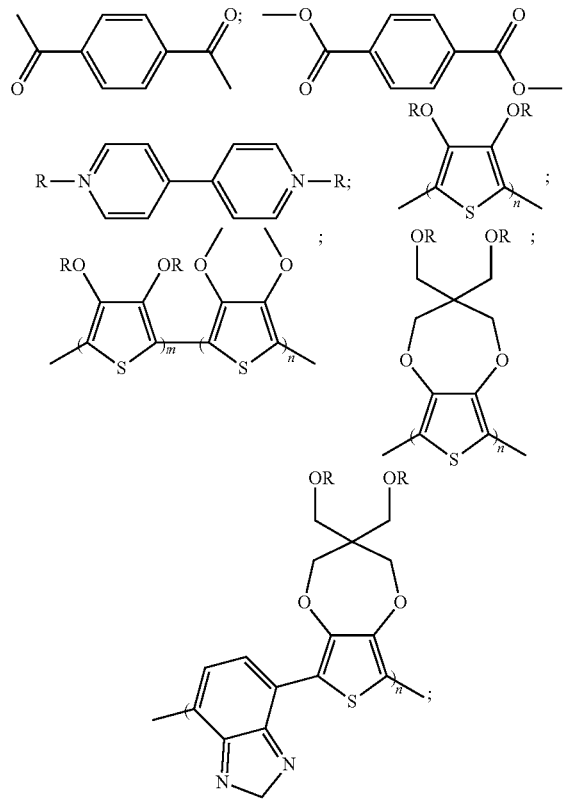

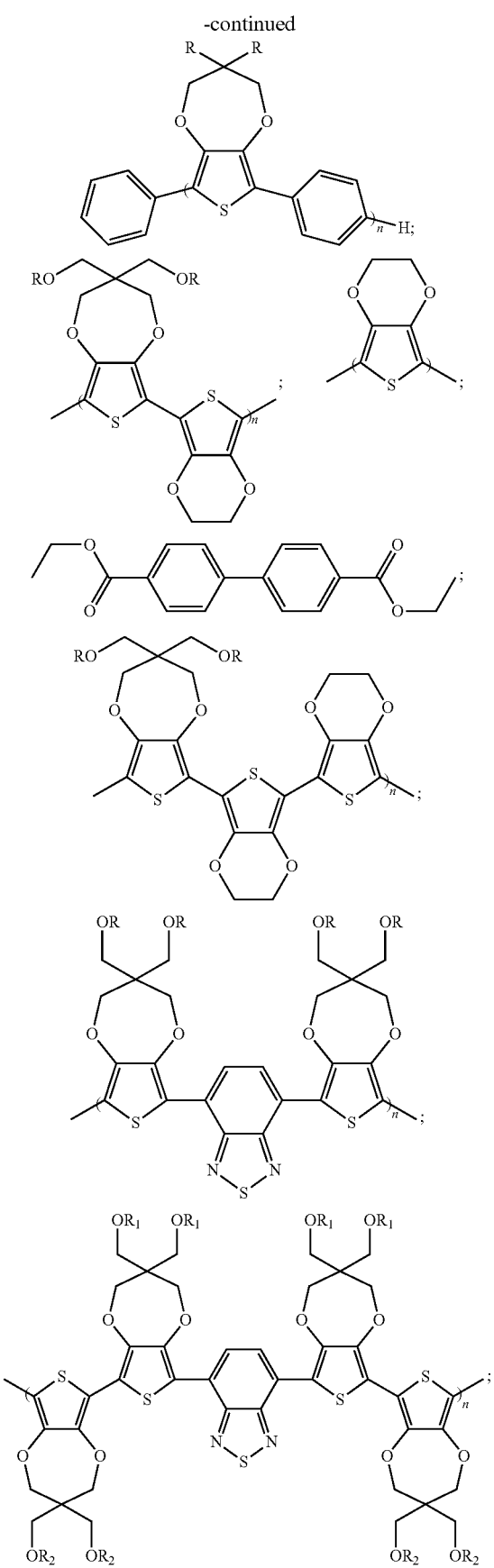

wherein each R, $R_1$, and $R_2$ is independently $C_1$-$C_8$ alkyl; or a compound of Formula A

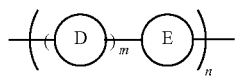

(A)

wherein D represents

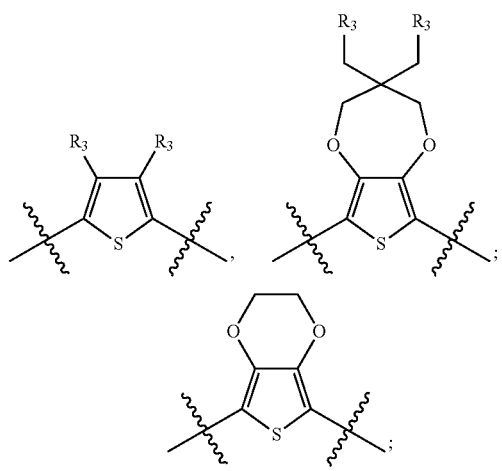

and E represents wherein each $R_3$, $R_4$, and $R_5$ is independently $C_1$-$C_8$ alkyl; and m and n are 1 or 2.

10. An electrochromic device according to claim 4, wherein the membrane is a gel.

11. An electrochromic device according to claim 3, wherein at least one of the membrane first surface and the membrane second surface is in contact with an electrochromic compound.

12. An electrochromic device according to claim 3, wherein the transparent material is polycarbonate.

13. An electrochromic device according to claim 1, wherein the polymer is a thermoplastic polymer, a silicone, a silicone polyether, a silicone acrylic, a polyacrylate, a polyethylene oxide, a fluorine resin, a vinylidene fluoride-based fluorine rubber, or an epoxy resin.

14. An electrochromic device according to claim 1, wherein the transparent material is coated with the dielectric material capable of transmitting light within a range of about 400 nm to 700 nm.

15. An electrochromic device according to claim 1, wherein the transparent material is coated with the dielectric material capable of blocking radiation outside of about 400-700 nm.

16. An electrochromic device according to claim 1, wherein the transparent material is coated with the anti-reflective coating.

17. A helmet comprising an extravehicular visor comprising an electrochromic device according to claim 1.

18. A helmet according to claim 17, further comprising a coupling mechanism for hermetically securing the helmet to a pressure suit.

19. An electrochromic device according to claim 1, further comprising a gold coating on the exterior of the first curved layer of transparent material.

20. An electrochromic device according to claim 1, wherein the electrochromic compound is a compound of any of the following formula:

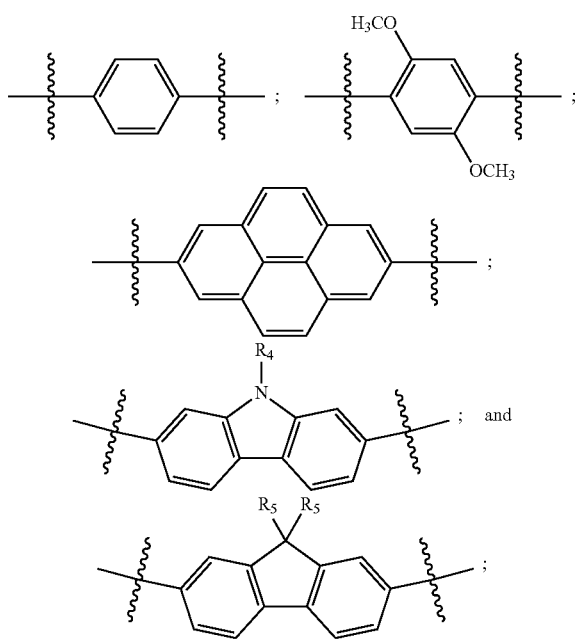

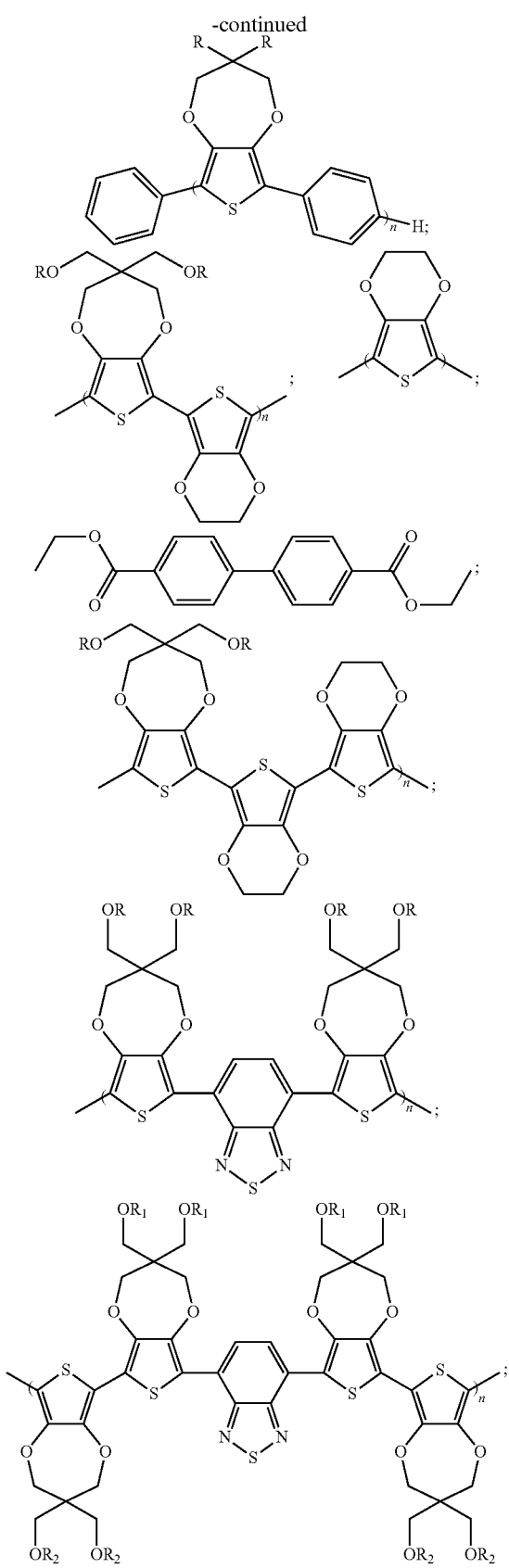
wherein each R, $R_1$, and $R_2$ is independently $C_1$-$C_8$ alkyl; or a compound of Formula A
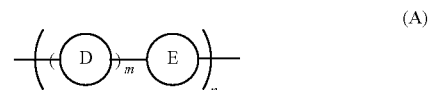
wherein D represents
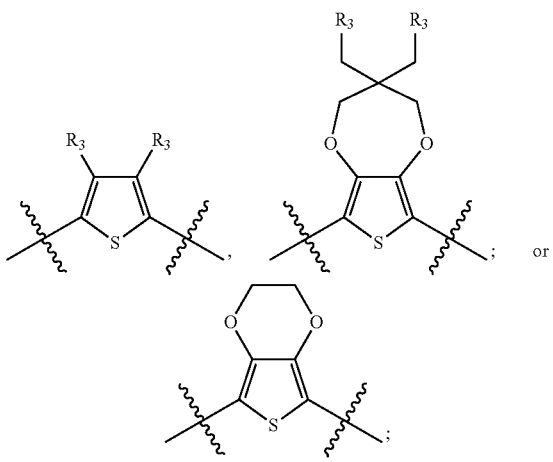
and E represents
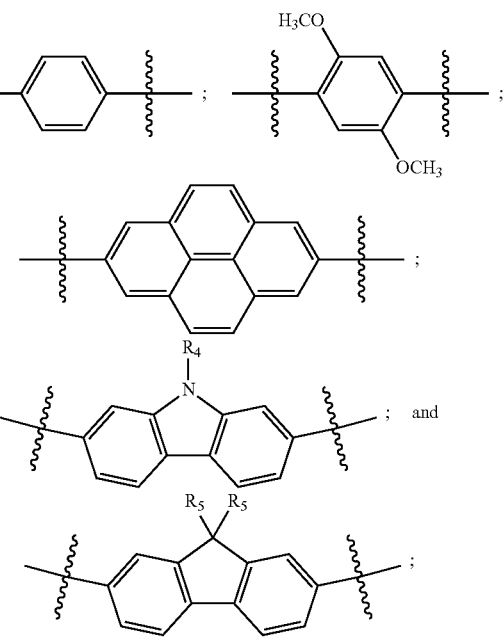
wherein each $R_3$, $R_4$, and $R_5$ is independently $C_1$-$C_8$ alkyl; and
m and n are 1 or 2.
* * * * *